(12) United States Patent
Hasegawa et al.

(10) Patent No.: US 6,361,841 B1
(45) Date of Patent: Mar. 26, 2002

(54) OIL WELL PIPE

(75) Inventors: Kayo Hasegawa; Keiji Sugawara; Masatsugu Nishi; Hideyuki Wada, all of Tokyo (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/147,934

(22) PCT Filed: Jul. 17, 1998

(86) PCT No.: PCT/JP98/03225

§ 371 Date: May 21, 1999

§ 102(e) Date: May 21, 1999

(87) PCT Pub. No.: WO99/05440

PCT Pub. Date: Feb. 4, 1999

(30) Foreign Application Priority Data

Jul. 22, 1997 (JP) .............................. 9-195655
Jul. 22, 1997 (JP) .............................. 9-195656
Jul. 22, 1997 (JP) .............................. 9-195657
Jul. 22, 1997 (JP) .............................. 9-195658

(51) Int. Cl.$^7$ .............................. F16L 9/02; F16L 9/14
(52) U.S. Cl. ..................... 428/35.7; 138/138; 428/35.8; 428/461; 428/468; 428/484; 428/492; 428/516; 428/523
(58) Field of Search .......................... 138/138; 428/35.7, 428/35.8, 461, 484, 492, 516, 523, 468, 37

(56) References Cited

U.S. PATENT DOCUMENTS 4,073,759 A  *  2/1978 Lowry et al. .............. 260/28.5
4,483,396 A  *  11/1984 Kennelly .................. 166/244

FOREIGN PATENT DOCUMENTS

| JP | 61-139213   |   | 6/1986  |
|----|-------------|---|---------|
| JP | 01210338 A  | * | 8/1989  |
| JP | 03207647 A  | * | 9/1991  |
| JP | 04302794 A  | * | 10/1992 |
| JP | 7-119376    |   | 5/1995  |
| JP | 8-270841    |   | 10/1996 |

* cited by examiner

Primary Examiner—Harold Pyon
Assistant Examiner—Sandra M. Nolan
(74) Attorney, Agent, or Firm—Flynn, Thiel, Boutell & Tanis, P.C.

(57) ABSTRACT

This invention provides an oil well pipe which is resistant to fracturing caused by ground subsidence by providing a sliding layer on the outside of the oil well pipe to reduce the frictional force acting on the oil well pipe. Furthermore, by constituting the sliding layer by a material and a thickness so that the residual negative frictional force becomes $2 \times 10^3$ N/m$^2$ or less after 1 year of deformation at the operating temperature of the oil well pipe, or by the sliding layer comprising a material of which the stiffness factor S(t) after 1 year of deformation is in the range from $10^{-5}$ N/m$^2$ to $10^3$ N/m$^2$ at the operating temperature of the oil well pipe and providing an adhesive layer between the pipe body and the sliding layer, thereby reducing the sliding phenomenon upon construction which restricts the properties of the sliding layer. Further, by the improvement of the adhesive force of the

12 Claims, 1 Drawing Sheet

OIL WELL PIPE

TECHNICAL FIELD

This invention relates to an oil well pipe casing which is not fractured, even when used in the circumstances where the pipe receives a strain caused by ground subsidence or the like.

BACKGROUND ART

An oil well for drawing crude oil from oil reservoir up to the surface is formed by an oil well pipe, and the oil well pipe is composed of an oil well pipe tubing which draws up the crude oil and an oil well pipe casing which protects the oil well pipe tubing at its exterior.

Since the oil well mentioned above is, in general, bored vertically, a frictional force acts on the oil well pipe casing (hereinafter, simply referred to as oil well pipe) in the downward direction, when ground subsidence occurs.

However, in most conventional oil wells, the frictional force acting on the aforementioned oil well pipe is not always so great. Accordingly, the probability of fracturing the oil well pipe is low, and a measure for reducing the frictional force has not been taken.

While, recently, the depth of oil wells tends to be deeper with worse oil lifting conditions of crude oil, oil well pipe fracture problems by ground subsidence have become greater. That is, by the great depth, the oil well pipe is loaded with a great pressure resulting in an increase in the frictional force acting thereon to break the oil well pipe, and now, such a situation cannot be neglected.

As a solution, U.S. Pat. No. 4,483,396 discloses an oil well pipe formed by combining two pipes having a different diameter. They move by sliding with respect to each other to vary the total length and absorb strain, and thereby, the influence of ground subsidence is reduced. However, the oil well pipe operates on a mechanical principle, and the cost of itself and peripheral equipment for operating it is very expensive. Furthermore, the oil well pipe is not effective for reducing strain on the pipe body and is effective only for reducing strain on the part to which the equipment is introduced, and therefore, it is not so practical.

The invention has been made in order to solve such a problem, and an object of the invention is to provide an oil well pipe which hardly fractures by ground subsidence and the like by providing a sliding layer on the outside of the body of the oil well pipe to reduce the frictional force acting on the oil well pipe.

Furthermore, in most cases, there is a long distance between the manufacturing place of oil well pipes and the place where they are actually used, and transportation of them is not so easy. Moreover, upon construction, it is necessary to set them up to reach a great depth. Therefore, the pipes are exposed to various external physical shocks before the practical use thereof. As a result of investigating damage to the sliding layers, the inventors found that there is a possibility of the sliding layer not exhibiting its own function by the partial separation of the sliding layer from the surface of a steel pipe.

Moreover, they also found a possibility of damaging the sliding layer during construction for burying the oil well pipe into the ground.

Furthermore, they also found that, taking the circumstance where the oil well pipe is left into consideration, the temperature of the oil well pipe becomes high, similar to the temperature during operation, during its construction, and the sliding layer begins to slide in the step of setting the oil well pipe.

Thereupon, a further object of the invention is to provide an oil well pipe capable of reducing the sliding phenomenon during construction by restricting the properties of the sliding layer, and furthermore, preventing the destruction of the sliding layer and degradation of frictional force-reducing effects by external physical shocks during transportation or construction of the oil well pipe by improving the adhesive force between the sliding layer and the oil well pipe body and introducing a protection layer on the sliding layer.

DISCLOSURE OF INVENTION

The present invention has been made in order to solve the above problems, and prevents an oil well pipe from fracturing by restricting the properties of the sliding layer, so that the sliding layer does not slide during construction and deforms with ground subsidence to reduce the frictional force.

Moreover, the present invention prevents damage due to physical shocks by providing an adhesive layer to strengthen the adhesion between the sliding layer and the steel pipe and by introducing a protection layer on the sliding layer.

The sliding layer covers the outside of the oil well pipe and exhibits a viscosity at the operating temperature. Accordingly, when frictional forces accompanied with ground subsidence acts on the oil well pipe buried vertically in the ground, the sliding layer having a viscosity and covering the outside of the oil well pipe is drawn downward and deformed by the frictional force. Since most of the frictional force acting on the oil well pipe is spent in the deformation of the sliding layer, the frictional force acting on the oil well pipe body is reduced.

Figure 3:
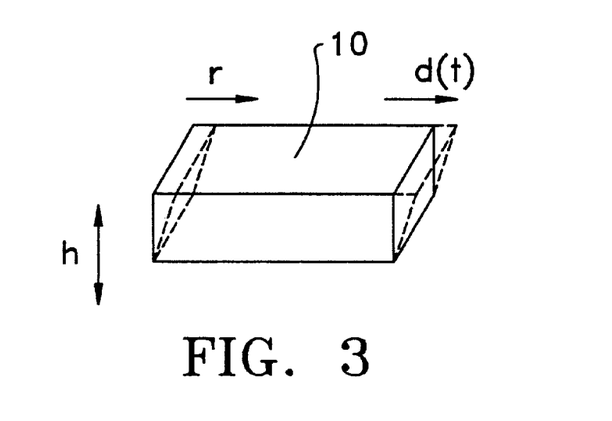
FIG. 3 is a schematic view illustrating the viscous behavior of the sliding layer.

Such a phenomenon is explained using a schematic view shown in FIG. 3 as follows: Namely, when shear stress caused by ground subsidence acts on the upper face of the sliding layer 10 h in thickness and exhibiting a viscous behavior, shear deformation (viscous behavior) as shown in the figure by a broken line occurs after t seconds in response to residual negative frictional force $\tau$.

The relation between the quantity of shear deformation d(t) after t seconds and the residual negative frictional force $\tau$ can be represented by the formula (1) using a stiffness factor S(t) of the sliding layer and thickness h of the sliding layer.

$$\tau = S(t) \cdot d(t)/3h \qquad (1)$$

From the formula (1), it can be seen that the residual negative frictional force $\tau$ can be made small by using a material having a small stiffness factor S(t) as the sliding layer.

By a model experiment, it has been found that, in order to decrease the possibility of fracturing an oil well pipe by ground subsidence, the fracture can be inhibited completely by rendering the frictional force $\tau$ equal to $4 \times 10^3$ N/m$^2$ or less, particularly $2 \times 10^3$ N/m$^2$ or less.

Since the friction force $\tau$ depends on oil well temperature, thickness of the sliding layer, quantity of ground subsidence and time, the thickness of the sliding layer and the stiffness factor of the material of the sliding layer for rendering the frictional force $\tau$ equal to $2 \times 10^3$ N/m$^2$ or less can be determined by substituting the above values under the practical operating conditions for the formula (1). By providing the oil well pipe with a sliding layer so designed, the fracture of the oil well pipe caused by ground subsidence at an oil well is prevented.

Furthermore, as the S(t) value, it was found to be enough to use the stiffness after 1 year determined by extrapolating a time-stiffness curve obtained based on the measurement of a dynamic viscoelasticity meter, a shear-creep tester, a sliding plate rheometer or the like.

In general, the thickness of the sliding layer is 1 mm or more, and the shear quantity for 1 year is 5 mm or more. Then, when the stiffness factor S(t) after 1 year is in the range of $10^{-5}$ N/m$^2$ to $10^3$ N/m$^2$, the frictional force l stays within $2 \times 10^3$ N/m$^2$. As a result, the oil well pipe resists fracturing and the fracturing of the oil well does not substantially occur.

While, in the case of $10^{-5}$ or less, it melts away.

In other words, under general conditions as above, materials having a stiffness factor S(t) exceeding $10^3$ N/m$^2$ after 1 year are insufficient in deformability, and the fracture probability of the oil well pipe is high without reducing the frictional force.

Namely, in the case where the sliding layer has a thickness of 2 mm and a quantity of shear d(t) after 1 year of 10 mm, when the stiffness factor S(t) after 1 year is $10^3$ N/m$^2$ or less, the frictional force τ stays within $2 \times 10^3$ N/m$^2$, and the oil well pipe resists fracturing. Furthermore, when the stiffness factor S(t) after 1 year is $10^2$ N/M$^2$ or less, the frictional force acting on the sliding layer stays within $2 \times 10^2$ N/m$^2$, and fracturing of the oil well pipe does not substantially occur.

Besides, it was found that, since the temperature of the oil well pipe upon construction is frequently lower than the operating temperature by about 20° C., which is also a high temperature, deformation of the sliding layer begins by the weight of the sliding layer or various stresses occurring during construction. It was also found that, in order to avoid it, when the stiffness of the material after 10 days is $2 \times 10^2$ N/M$^2$ or more, particularly $10^3$ N/m$^2$ in the temperature range of construction, the above shear deformation does not occur.

As mentioned above, the oil well pipe of the invention functions to reduce the frictional force between sunken ground and the oil well pipe body by the viscous behavior of the sliding layer to prevent the oil well pipe from fracturing. The thickness of the sliding layer is selected according to the temperature where the oil well pipe is used and the quantity of ground subsidence.

1 Oil well pipe body
2 Surface treatment layer, such as chemical conversion treatment or primer treatment (optionally, it can be omitted)
3 Adhesive layer
4 Sliding layer
5 Protection layer
6 Primer coating tank
7 Heating oven
8 Adhesive layer extruder
9 Sliding layer extruder
10 Protection layer extruder

BEST MODE FOR CARRYING OUT THE INVENTION

As a result of investigating various materials which satisfy the above conditions in various temperature ranges due to various oil well temperatures, several materials suitable for the sliding layer were found.

Namely, it is enough that the stiffness S(t) of the sliding layer after 1 year under its operating temperature falls in the range of $10^{-5}$ to $10^3$ N/m$^2$ according to the quantity of general ground subsidence, which becomes a problem of ground subsidence, and to the general thickness of the sliding layer. These are achieved, and conditions of not fracturing the oil well pipe can be satisfied by several materials.

First, as to asphalt, a material of which the stiffness factor after 1 year elapsed enters a range of $10^{-5}$ to $10^3$ N/m$^2$ at a temperature range of 40 to 100° C. by mixing straight asphalt and heated asphalt at a prescribed rate. It is possible to incorporate an additive, such as a resin, fat, rubber, pigment or filler.

Polyethylene is also usable. The polyethylene of the sliding layer has a melting point of 95° C. or more, preferably about 95 to 130° C., particularly preferably about 100 to 130° C., a softening point of about 50 to 120° C., preferably about 90 to 120° C. As to the other properties, a preferable MI is 20 g/10 min or less, preferably 0.01 to 20 g/10 min, particularly 0.1 to 10 g/10 min, and a preferable yield stress is 200 kgf/cm$^2$ or less, preferably 80 to 150 kgf/cm$^2$, particularly 80 to 120 kgf/cm$^2$. A preferable drawable speed by melt tension is 10 m/min or more.

Maleic anhydride-modified polyethylene which is produced by allowing maleic anhydride to react with polyethylene is also usable.

As to ethylene-vinyl acetate copolymer, a material satisfying the aforementioned stiffness range in a desired temperature range can be obtained by selecting an optimum composition. For example, in order to satisfy the aforementioned stiffness value in the range of 40 to 130° C., the amount of vinyl acetate in the ethylene-vinyl acetate copolymer is 5 to 60 wt. %.

Maleic anhydride-modified ethylene-vinyl acetate copolymer resin produced by allowing maleic anhydride to react with ethylene-vinyl acetate copolymer is also usable.

Ethylene-maleic anhydride copolymer resin, ethylene-acrylic ester copolymer resin, ethyelene- maleic anhydride-acrylic acid copolymer resin, etc. are also usable.

Furthermore, when the temperature of the oil well is high, polypropylene, maleic anhydride-modified polypropylene, polybutene, ethylene-propylene copolymer resin, etc. are usable.

To the resin used for the aforementioned sliding layer, if necessary, it is possible to add an additive(s), such as an antioxidant, heat stabilizer, light stabilizer, pigment, inorganic filler, flame retardant, plasticizer, nucleating agent and antistatic agent, in an amount which does not degrade the required performance.

A suitable thickness of the sliding layer is about 0.5 to 10 mm, usually about 1 to 5 mm, although it varies according to the quantity of the expected ground subsidence, material and the like.

In most cases, there is a long distance between the manufacturing place of the oil well pipes and the place where they are actually used, and transportation of them is not so easy. Moreover, upon construction, it is necessary to set them up to a great depth. Therefore, the pipes are exposed to various external physical shocks before the practical use thereof. As a result, in extreme cases, there is a possibility of breaking the aforementioned sliding layer by physical shocks, allowing the sliding layer to separate or fall off resulting in not exhibiting the function of the sliding layer after construction.

However, according to the invention, by providing an adhesive layer between the sliding layer and the oil well pipe body, the adhesive force between the sliding layer and the oil well pipe body is improved, and it is possible to prevent the sliding layer from being damaged by physical shocks or the like.

The adhesive layer is preferably formed of an unsaturated carboxylic acid group compound-modified polyolefin resin or a copolymer resin of an unsaturated carboxylic acid group compound and an olefin, having an adhesiveness to the sliding layer. The unsaturated carboxylic acid group compound is a generic term for unsaturated carboxylic acids and derivatives thereof, and the derivatives are esters, amides, anhydrides, and the like. Illustrative of the unsaturated carboxylic acid group compounds are acrylic acid, methacrylic acid, maleic acid, fumaric acid, itaconic acid, nudic acid, maleic anhydride, citraconic anhydride, methyl acrylate, ethyl methacrylate, glycidyl acrylate, dimethyl maleate, acrylic amide, maleic monoamide, N-butylmaleimide, and the like. Among them, acrylic acid, maleic acid, maleic anhydride and nudic acid are preferable, and maleic anhydride is particularly preferred. The olefin is ethylene, propylene, ethylene/vinyl acetate or the like, and ethylene and propylene are particularly preferred. The adhesive resins are available from various companies by the trade name of N-Polymer, Admer, Modic or the like. Preferable resins for the adhesive layer of the invention are maleic anhydride-modified polyethylene, ethylene-maleic anhydride copolymer resin, ethylene maleic anhydride-acrylate ester copolymer resin, maleic anhydride-modified ethylene-vinyl acetate copolymer resin, maleic anhydride-modified polypropylene and the like, and it is preferable that the adhesive layer is composed of the above resin(s) as the principal component. In the case of using the above material (s) as the adhesive layer, the layer is strongly bonded to the sliding layer located on the outside of the adhesive layer due to fusing by the heat upon molding. As a result of forming strong bonds between maleic anhydride groups or the like in the above resin(s) and polar groups, such as hydroxyl groups, of the substrate, such as chemical conversion treatment, primer treatment or substrate iron, located on the inside of the adhesive layer, through hydrogen bonding, covalent bonding, electrostatic bonding or the like, the adhesive layer can strongly bond between the sliding layer and the oil well pipe body. It is enough that the respective maleic anhydride component, acrylic acid component, etc., in the above resin(s) are contained to the degree capable of exhibiting the necessary adhesive force, and further, a resin in an amount which induces a viscosity for facilitating molding can be selected. In general, a suitable content of the unsaturated carboxylic acid group compound is about 0.01 to 20 wt.%, preferably 0.05 to 5 wt.%. A suitable thickness of the adhesive layer is about 0.05 to 2 mm, preferably about 0.1 to 0.5 mm.

To the resin used for the above adhesive layer, if necessary, it is possible to add an additive(s), such as an antioxidant, heat stabilizer, light stabilizer, pigment, inorganic filler, flame retardant, plasticizer, nucleating agent and antistatic agent, in an amount which does not degrade the required performance.

The above adhesive layer and the sliding layer can be formed on the external surface of the oil well pipe body by extrusion coating, laminating, powder coating or the like.

Besides, a chemical conversion treatment, such as chromate treatment, and/or primer treatment composed of an epoxy resin or the like may be provided for improving the adhesiveness of the adhesive layer to the substrate or for strengthening the antirusting ability.

It is possible to provide a protection layer on the sliding layer. The protection layer functions to prevent damage to the sliding layer and the oil well pipe body upon transportation and burying construction of the oil well pipe.

For the protection layer, a material is used which does not soften under the circumstances where the oil well pipe is used. That is, when the upper limit of the operating temperature is 130° C., the material to be used has a softening point exceeding 130° C.

As such a material, there are polyolefin resins, such as polypropylene and ethylene-propylene block copolymer, and particularly, a polypropylene and ethylene-propylene block copolymer having a softening point of 140 to 170° C. are preferred.

To the protection layer, if necessary, it is possible to add an additive(s) similar to the sliding layer.

A suitable thickness of the protection layer is about 0.1 to 10 mm, preferably about 0.5 to 5 mm. The protection layer can be molded on the outer periphery of the sliding layer by extrusion coating or the like. On the other hand, metals, such as soft steel, are also usable as the protection layer. For example, a steel strip of soft steel can be spirally wound to make the protection layer. The presence of the protection layer does not influence the frictional force acting on the oil well pipe.

As the manufacture of the oil well pipe of the invention, first, a steel pipe is optionally provided with a pretreatment and further a surface treatment. The pretreatment in the invention is degreasing, acid pickling, shot blasting, etc. The surface treatment is to form a membrane on the steel surface, and includes primer treatment using a primer, such as an epoxy resin-based one, as well as chromate treatment and zinc phosphate treatment.

Figure 1:
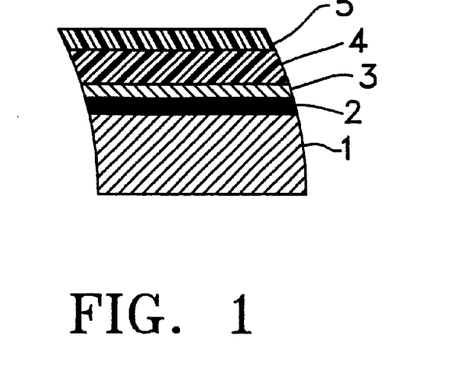
FIG. 1 is a partial section of an oil well pipe embodying the invention.

Subsequent to the pretreatment and surface treatment, the adhesive layer 3 and the sliding layer 4, which have been heated above their melting points, are coextruded into a tube-shape or sheet-shape by a double layer die to coat the outer periphery of the oil well body 1, and then, the protection layer 5 is coated thereonto to manufacture the oil well pipe. As another coating method, it is possible to coat with the adhesive layer, the sliding layer, the protection layer in this order by a single layer die.

Figure 2:
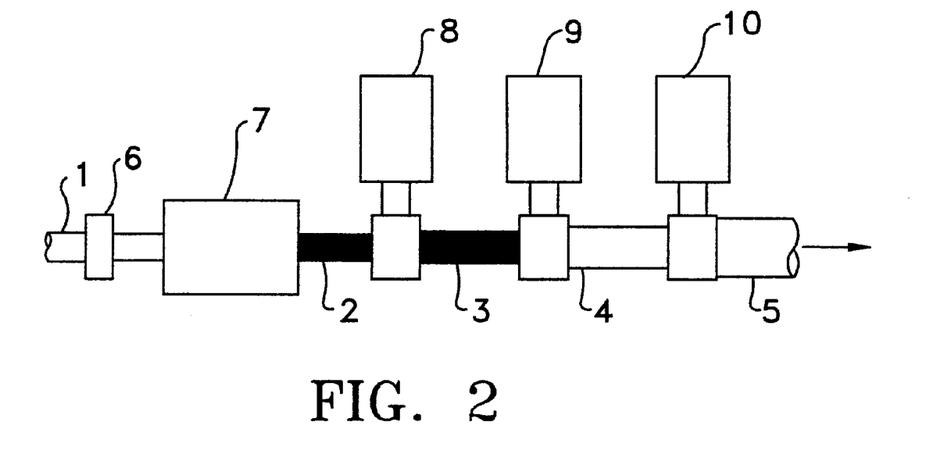
FIG. 2 is an illustration showing the production of an oil well pipe which is an example of the invention.

An oil well pipe embodying the invention is explained according to FIG. 1 and FIG. 2. FIG. 1 is a section of the oil pipe wherein, 1 is the oil well body, 2 is a surface preparation layer, such as chemical conversion treatment, primer treatment or the like (it is possible to omit it, if desired), 3 is an adhesive layer, 4 is a sliding layer, and 5 is a protection layer.

FIG. 2 is an illustration showing a manufacture of an oil well pipe. The oil well pipe is produced by applying the primary layer 2 to the outer periphery of the oil well pipe body 1 by a primer coating tank 6, curing by a heating oven 7, applying the adhesive layer 3 by an adhesive layer extruder 8, applying the sliding layer 4 by a sliding layer extruder 9, and applying the protection layer 5 by a protection layer extruder 10, respectively.

EXAMPLES

Examples 1–63

Using the apparatus shown in FIG. 2, the sliding layer, the adhesive layer (thickness: 0.2 mm), the protection layer (thickness: 3 mm) shown in Tables 1–4 (Examples 1–63) were provided on the outer periphery of a steel pipe having an outer diameter of 177.8 mm, a thickness of 23.8 mm, a length of 12,000 mm to manufacture oil well pipes.

In the table, the drawable speed is, when a strand formed by extruding a resin at 200° C. at a rate of 3 g/min is taken off at a constant speed, the speed capable of being taken off without cutting of the strand.

TABLE 1

| | Sliding Layer | | | | | | | | |
|---|---|---|---|---|---|---|---|---|---|
| | Properties of Main Material | | | | | | | | |
| | Main Material | Density (g/cm$^2$) | Melting Point (° C.) | MI (g/10 min) | Yield Point (kg/cm$^2$) | Softening Point (° C.) | Drawable Speed (m/min) | Thickness (mm) | Adhesive Layer | Protection Layer |
|---|---|---|---|---|---|---|---|---|---|---|
| Example 1 | Asphalt Mix. | — | — | — | — | — | — | 2 | — | Polypropylene |
| Example 2 | Heated Asphalt | — | — | — | — | — | — | 2 | — | Polypropylene |
| Example 3 | Asphalt Mix. | — | — | — | — | — | — | 2 | — | — |
| Example 4 | Heated Asphalt | — | — | — | — | — | — | 2 | — | — |
| Example 5 | Polyethylene | 0.946 | 127 | 0.1 | 200 | 119 | 30 | 2 | Maleic Anhydride-Modified Polyethylene | Polypropylene |
| Example 6 | Polyethylene | 0.936 | 123 | 3.0 | 250 | 115 | 25 | 2 | Maleic Anhydride-Modified Polyethylene | Polypropylene |
| Example 7 | Polyethylene | 0.931 | 120 | 2.1 | 160 | 115 | 35 | 2 | Maleic Anhydride-Modified Polyethylene | Polypropylene |
| Example 8 | Polyethylene | 0.920 | 109 | 0.3 | 90 | 96 | 30 | 2 | Maleic Anhydride-Modified Polyethylene | Polypropylene |
| Example 9 | Polyethylene | 0.920 | 109 | 0.3 | 90 | 96 | 30 | 2 | Maleic Anhydride-Modified Polyethylene | Polypropylene |
| Example 10 | Polyethylene | 0.926 | 120 | 0.9 | 100 | 97 | 25 | 2 | Maleic Anhydride-Modified Polyethylene | Polypropylene |
| Example 11 | Polyethylene | 0.917 | 95 | 1.5 | 8 | 83 | 40 | 2 | Maleic Anhydride-Modified Polyethylene | Polypropylene |
| Example 12 | Polyethylene | 0.926 | 120 | 0.9 | 100 | 7 | 25 | 2 | Ethylene-Maleic Anhydride Copolymer | Polypropylene |
| Example 13 | Polyethylene | 0.926 | 120 | 0.9 | 100 | 97 | 25 | 2 | Ethylene-Maleic Anhydride-Acrylic Ester Copolymer | Polypropylene |
| Example 14 | Polyethylene | 0.926 | 120 | 0.9 | 100 | 97 | 25 | 2 | Maleic Anhydride-Modified Polyethylene | Polybutene |
| Example 15 | Polyethylene | 0.926 | 120 | 0.9 | 100 | 97 | 25 | 2 | Maleic Anhydride-Modified Polyethylene | Ethylene-Propylene Copolymer |
| Example 16 | Maleic Anhydride-Modified Polyethylene | 0.928 | 120 | 0.9 | 120 | 87 | 30 | 2 | — | Polypropylene |
| Example 17 | Maleic Anhydride-Modified Polyethylene | 0.900 | 100 | 1.1 | 100 | 68 | 30 | 2 | — | Polypropylene |
| Example 18 | Maleic Anhydride-Modified Polyethylene | 0.928 | 120 | 0.9 | 120 | 87 | 30 | 2 | Maleic Anhydride-Modified Polyethylene | Polypropylene |
| Example 19 | Polyethylene | 0.946 | 127 | 0.1 | 200 | 119 | 30 | 2 | Maleic Anhydride-Modified Polyethylene | — |
| Example 20 | Polyethylene | 0.920 | 109 | 0.3 | 90 | 96 | 30 | 2 | Maleic Anhydride-Modified Polyethylene | — |
| Example 21 | Polyethylene | 0.946 | 127 | 0.1 | 200 | 119 | 30 | 2 | — | Polypropylene |
| Example 22 | Polyethylene | 0.920 | 109 | 0.3 | 90 | 96 | 30 | 2 | — | Polypropylene |
| Example 23 | Polyethylene | 0.920 | 109 | 0.3 | 90 | 96 | 30 | 2 | — | — |

TABLE 2

| | Sliding Layer | | | | | |
|---|---|---|---|---|---|---|
| | Main Material | Vinyl Acetate Rate (wt. %) | Maleic Anhydride-Modified Polyethylene Mixed Rate | Thickness (mm) | Adhesive Layer | Protection Layer |
| Example 24 | Ethylene-Vinyl Acetate Copolymer | 6 | 0 | 2 | Maleic Anhydride-Modified Polyethylene | Polypropylene |
| Example 25 | Ethylene-Vinyl Acetate Copolymer | 10 | 0 | 2 | Maleic Anhydride-Modified Polyethylene | Polypropylene |
| Example 26 | Ethylene-Vinyl Acetate Copolymer | 14 | 0 | 2 | Maleic Anhydride-Modified Polyethylene | Polypropylene |
| Example 27 | Ethylene-Vinyl Acetate Copolymer | 19 | 0 | 2 | Maleic Anhydride-Modified Polyethylene | Polypropylene |
| Example 28 | Ethylene-Vinyl Acetate Copolymer | 25 | 0 | 2 | Maleic Anhydride-Modified Polyethylene | Polypropylene |

TABLE 2-continued

| | | Sliding Layer | | | | |
|---|---|---|---|---|---|---|
| | Main Material | Vinyl Acetate Rate (wt. %) | Maleic Anhydride-Modified Polyethylene Mixed Rate | Thickness (mm) | Adhesive Layer | Protection Layer |
| Example 29 | Ethylene-Vinyl Acetate Copolymer | 33 | 0 | 2 | Maleic Anhydride-Modified Polyethylene | Polypropylene |
| Example 30 | Ethylene-Vinyl Acetate Copolymer | 41 | 0 | 2 | Maleic Anhydride-Modified Polyethylene | Polypropylene |
| Example 31 | Ethylene-Vinyl Acetate Copolymer | 46 | 0 | 2 | Maleic Anhydride-Modified Polyethylene | Polypropylene |
| Example 32 | Ethylene-Vinyl Acetate Copolymer | 19 | 10 | 2 | Maleic Anhydride-Modified Polyethylene | Polypropylene |
| Example 33 | Ethylene-Vinyl Acetate Copolymer | 19 | 25 | 2 | Maleic Anhydride-Modified Polyethylene | Polypropylene |
| Example 34 | Ethylene-Vinyl Acetate Copolymer | 19 | 50 | 2 | Maleic Anhydride-Modified Polyethylene | Polypropylene |
| Example 35 | Ethylene-Vinyl Acetate Copolymer | 19 | 0 | 2 | Ethylene-Maleic Anhydride Copolymer | Polypropylene |
| Example 36 | Ethylene-Vinyl Acetate Copolymer | 19 | 0 | 2 | Maleic Anhydride-Modified Polyethylene | Ethylene-Propylene Copolymer |
| Example 37 | Maleic Anhydride-Modified Ethylene-Vinyl Acetate Copolymer | 19 | 0 | 2 | — | Polypropylene |
| Example 38 | Maleic Anhydride-Modified Ethylene-Vinyl Acetate Copolymer | 19 | 0 | 2 | — | Ethylene-Propylene Copolymer |
| Example 39 | Ethylene-Vinyl Acetate Copolymer | 19 | 0 | 2 | Maleic Anhydride-Modified Polyethylene | — |
| Example 40 | Ethylene-Vinyl Acetate Copolymer | 19 | 0 | 2 | — | Polypropylene |

TABLE 3

| | | Sliding Layer | | | | |
|---|---|---|---|---|---|---|
| | Main Material | Maleic Anhydride Rate (wt. %) | Acrylic Ester Rate (wt. %) | Thickness (mm) | Adhesive Layer | Protection Layer |
| Example 41 | Ethylene-Maleic Anhydride Copolymer | 2 | — | 2 | — | Polypropylene |
| Example 42 | Ethylene-Maleic Anhydride Copolymer | 5 | — | 2 | — | Polypropylene |
| Example 43 | Ethylene-Maleic Anhydride Copolymer | 2 | — | 2 | — | Ethylene-Propylene Copolymer |
| Example 44 | Ethylene-Maleic Anhydride Copolymer | 2 | — | 2 | Maleic Anhydride-Modified Polyethylene | Polypropylene |
| Example 45 | Ethylene-Maleic Anhydride Copolymer | 2 | — | 2 | Maleic Anhydride-Modified Polyethylene | — |
| Example 46 | Ethylene-Acrylic Ester Copolymer | — | 10 | 2 | Maleic Anhydride-Modified Polyethylene | Polypropylene |
| Example 47 | Ethylene-Acrylic Ester Copolymer | — | 25 | 2 | Maleic Anhydride-Modified Polyethylene | Polypropylene |
| Example 48 | Ethylene-Acrylic Ester Copolymer | — | 25 | 2 | Maleic Anhydride-Modified Polyethylene | — |
| Example 49 | Ethylene-Acrylic Ester Copolymer | — | 25 | 2 | Maleic Anhydride-Modified Polyethylene | Polypropylene |
| Example 50 | Ethylene-Maleic Anhydride-Acrylic Ester Copolymer | 2 | 15 | 2 | — | Polypropylene |
| Example 51 | Ethylene-Maleic Anhydride-Acrylic Ester Copolymer | 2 | 20 | 2 | — | Polypropylene |
| Example 52 | Ethylene-Maleic Anhydride-Acrylic Ester Copolymer | 3 | 6 | 2 | — | Polypropylene |
| Example 53 | Ethylene-Maleic Anhydride-Acrylic Ester Copolymer | 3 | 6 | 2 | Maleic Anhydride-Modified Polyethylene | — |
| Example 54 | Ethylene-Maleic Anhydride-Acrylic Ester Copolymer | 3 | 6 | 2 | — | — |

TABLE 4

| | | Properties of Main Material | | | | | | |
| | Main Material | Density (g/cm²) | Melting Point (° C.) | MI (g/10 min) | Yield Point (kg/cm²) | Softening Point (° C.) | Thickness (mm) | Adhesive Layer | Protection Layer |
|---|---|---|---|---|---|---|---|---|---|
| Example 55 | Polypropylene | 0.906 | 168 | 0.6 | 204 | 145 | 2 | Maleic Anhydride-Modified Polyethylene | — |
| Example 56 | Polypropylene | 0.912 | 159 | 0.9 | 210 | 140 | 2 | Maleic Anhydride-Modified Polyethylene | — |
| Example 57 | Polypropylene | 0.906 | 168 | 0.6 | 204 | 145 | 2 | — | — |
| Example 58 | Polybutene | 0.921 | 160 | 0.4 | 170 | 118 | 2 | Maleic Anhydride-Modified Polyethylene | Polypropylene |
| Example 59 | Polybutene | 0.921 | 160 | 0.4 | 170 | 118 | 2 | — | Polypropylene |
| Example 60 | Maleic Anhydride-Modified Polypropylene | 0.901 | 150 | 1.1 | 150 | 116 | 2 | — | Polypropylene |
| Example 61 | Maleic Anhydride-Modified Polypropylene | 0.901 | 150 | 1.1 | 150 | 116 | 2 | — | — |
| Example 62 | Ethylene-Propylene Copolymer | 0.900 | — | 1.3 | 270 | 110 | 2 | Maleic Anhydride-Modified Polyethylene | Polypropylene |
| Example 63 | Ethylene-Propylene Copolymer | 0.900 | — | 1.3 | 270 | 110 | 2 | — | — |
| Comparative 1 | Polyphenylenesulfide | — | 290 | — | — | — | 2 | — | — |

As to the oil well pipes of Examples 1–63, evaluations of the adhesive force, thermal shock resistance and water resistance were carried out. The results are shown in Tables 5 and 6.

Moreover, each sample of Examples 1–63 was placed in an oven at various temperatures, loaded with a force of 1 kg on an area of 1 mm², and left for 1 hour. Thereafter, the stability of the outermost layer was evaluated by appearance (cracking, separation, deformation), and the results are shown in Tables 7 and 8.

Adhesive Force

Notched in the pipe length direction with a width of 1 cm, and using a part as the gripping margin, the strength upon peeling was measured at a pulling speed of 50 mm/min at a peeling angle of 90°. The measuring temperature was 23° C.

Thermal Shock Resistance

The oil well pipe was subjected to cycles of 80° C. ⇆ 23° C. ⇆45° C. (each 1 hour), and the adhesive force after 20 cycles was measured.

Water Resistance

The oil well pipe was immersed in water (23° C.), and the separated state was observed after 30 days.

○: Not peeled

Δ: Peel length of 1 mm or less

X: Peel length of 1 mm or more

Furthermore, as to the oil well pipes of Examples 1–63 and Comparative Example 1, the stiffness factor S(t) of the sliding layer after 1 year elapsed at the temperature shown in the tables was measured, and residual negative fictional force τ upon a shear quantity of 200 mm was determined. Moreover, the availability under such a circumstance was tested, and the results are shown in Tables 9–14.

Furthermore, as to the oil well pipes of Examples 1–63, the stiffness factor S(t) of the sliding layer after 10 days elapsed at the temperature shown in the tables, and the results and evaluations concerning whether the sliding layer deformed or not at that temperature are shown in Tables 15–20.

The results of the evaluations of the adhesive layer, the protection layer, construction temperature and operation temperature ranges of Examples 1–63 and Comparative Example 1 are summarized in Tables 21 and 22.

TABLE 5

| | Adhesive Force (kgf/cm) | Thermal Shock Resistance (kgf/cm) | Water Resistance |
|---|---|---|---|
| Example 1 | 5 ~ 10 | 5 ~ 10 | ○ |
| Example 2 | 5 ~ 10 | 5 ~ 10 | ○ |
| Example 3 | 5 ~ 10 | 5 ~ 10 | ○ |
| Example 4 | 5 ~ 10 | 5 ~ 10 | ○ |
| Example 5 | >20 | >20 | ○ |
| Example 6 | >20 | >20 | ○ |
| Example 7 | >20 | >20 | ○ |
| Example 8 | >20 | >20 | ○ |
| Example 9 | >20 | >20 | ○ |
| Example 10 | >20 | >20 | ○ |
| Example 11 | >20 | >20 | ○ |
| Example 12 | 10 ~ 15 | 10 ~ 15 | ○ |
| Example 13 | 8 ~ 14 | 8 ~ 14 | ○ |
| Example 14 | >20 | >20 | ○ |
| Example 15 | >20 | >20 | ○ |
| Example 16 | >20 | >20 | ○ |
| Example 17 | >20 | >20 | ○ |
| Example 18 | >20 | >20 | ○ |
| Example 19 | >20 | >20 | ○ |
| Example 20 | >20 | >20 | ○ |
| Example 21 | ≦1 | ≦1 | X |
| Example 22 | <1 | ≦1 | X |
| Example 23 | <1 | <1 | X |
| Example 24 | >20 | >20 | ○ |
| Example 25 | >20 | >20 | ○ |
| Example 26 | >20 | >20 | ○ |
| Example 27 | >20 | >20 | ○ |
| Example 28 | >20 | >20 | ○ |
| Example 29 | >20 | >20 | ○ |
| Example 30 | >20 | >20 | ○ |
| Example 31 | >20 | >20 | ○ |

TABLE 6

| | Adhesive Force (kgf/cm) | Thermal Shock Resistance (kgf/cm) | Water Resistance |
|---|---|---|---|
| Example 32 | >20 | >20 | ○ |
| Example 33 | >20 | >20 | ○ |
| Example 34 | >20 | >20 | ○ |
| Example 35 | 10 ~ 15 | 10 ~ 15 | ○ |
| Example 36 | >20 | >20 | ○ |
| Example 37 | >20 | >20 | ○ |
| Example 38 | >20 | >20 | ○ |
| Example 39 | >20 | >20 | ○ |
| Example 40 | 2 ~ 5 | 2 ~ 4 | ○ |
| Example 41 | 10 ~ 14 | 10 ~ 15 | ○ |
| Example 42 | 12 ~ 17 | 12 ~ 17 | ○ |
| Example 43 | 10 ~ 14 | 12 ~ 15 | ○ |
| Example 44 | >20 | >20 | ○ |
| Example 45 | >20 | >20 | ○ |
| Example 46 | >20 | >20 | ○ |
| Example 47 | >20 | >20 | ○ |
| Example 48 | >20 | >20 | ○ |
| Example 49 | 2 ~ 3 | 2 ~ 3 | ○ |
| Example 50 | 7 ~ 12 | 7 ~ 12 | ○ |
| Example 51 | 7 ~ 12 | 7 ~ 12 | ○ |
| Example 52 | 5 ~ 9 | 5 ~ 8 | ○ |
| Example 53 | >20 | >20 | ○ |
| Example 54 | 5 ~ 9 | 5 ~ 8 | ○ |
| Example 55 | >20 | >20 | ○ |
| Example 56 | >20 | >20 | ○ |
| Example 57 | <1 | ≦1 | X |
| Example 58 | >20 | >20 | ○ |
| Example 59 | ≦1 | ≦1 | X |
| Example 60 | >20 | >20 | ○ |
| Example 61 | >20 | >20 | ○ |
| Example 62 | >20 | >20 | ○ |
| Example 63 | 1 ~ 2 | 1 ~ 2 | Δ |

TABLE 7

| | Oven Temperature | | | | | |
|---|---|---|---|---|---|---|
| | 100° C. | 110° C. | 120° C. | 130° C. | 140° C. | 150° C. |
| Example 1 | ○ | ○ | ○ | ○ | ○ | ○ |
| Example 2 | ○ | ○ | ○ | ○ | ○ | ○ |
| Example 3 | X | X | X | X | X | X |
| Example 4 | X | X | X | X | X | X |
| Example 5 | ○ | ○ | ○ | ○ | ○ | ○ |
| Example 6 | ○ | ○ | ○ | ○ | ○ | ○ |
| Example 7 | ○ | ○ | ○ | ○ | ○ | ○ |
| Example 8 | ○ | ○ | ○ | ○ | ○ | ○ |
| Example 9 | ○ | ○ | ○ | ○ | ○ | ○ |
| Example 10 | ○ | ○ | ○ | ○ | ○ | ○ |
| Example 11 | ○ | ○ | ○ | ○ | ○ | ○ |
| Example 12 | ○ | ○ | ○ | ○ | ○ | ○ |
| Example 13 | ○ | ○ | ○ | ○ | ○ | ○ |
| Example 14 | ○ | ○ | ○ | ○ | ○ | ○ |
| Example 15 | ○ | ○ | ○ | ○ | ○ | ○ |
| Example 16 | ○ | ○ | ○ | ○ | ○ | ○ |
| Example 17 | ○ | ○ | ○ | ○ | ○ | ○ |
| Example 18 | ○ | ○ | ○ | ○ | ○ | ○ |
| Example 19 | ○ | ○ | X | X | X | X |
| Example 20 | X | X | X | X | X | X |
| Example 21 | ○ | ○ | ○ | ○ | ○ | ○ |
| Example 22 | ○ | ○ | ○ | ○ | ○ | ○ |
| Example 23 | X | X | X | ○ | X | X |
| Example 24 | ○ | ○ | ○ | ○ | ○ | ○ |
| Example 25 | ○ | ○ | ○ | ○ | ○ | ○ |
| Example 26 | ○ | ○ | ○ | ○ | ○ | ○ |
| Example 27 | ○ | ○ | ○ | ○ | ○ | ○ |
| Example 28 | ○ | ○ | ○ | ○ | ○ | ○ |
| Example 29 | ○ | ○ | ○ | ○ | ○ | ○ |
| Example 30 | ○ | ○ | ○ | ○ | ○ | ○ |
| Example 31 | ○ | ○ | ○ | ○ | ○ | ○ |

TABLE 8

| | Oven Temperature | | | | | |
|---|---|---|---|---|---|---|
| | 100° C. | 110° C. | 120° C. | 130° C. | 140° C. | 150° C. |
| Example 32 | ○ | ○ | ○ | ○ | ○ | ○ |
| Example 33 | ○ | ○ | ○ | ○ | ○ | ○ |
| Example 34 | ○ | ○ | ○ | ○ | ○ | ○ |
| Example 35 | ○ | ○ | ○ | ○ | ○ | ○ |
| Example 36 | ○ | ○ | ○ | ○ | ○ | ○ |
| Example 37 | ○ | ○ | ○ | ○ | ○ | ○ |
| Example 38 | ○ | ○ | ○ | ○ | ○ | ○ |
| Example 39 | X | X | X | X | X | X |
| Example 40 | ○ | ○ | ○ | ○ | ○ | ○ |
| Example 41 | ○ | ○ | ○ | ○ | ○ | ○ |
| Example 42 | ○ | ○ | ○ | ○ | ○ | ○ |
| Example 43 | ○ | ○ | ○ | ○ | ○ | ○ |
| Example 44 | ○ | ○ | ○ | ○ | ○ | ○ |
| Example 45 | X | X | X | X | X | X |
| Example 46 | ○ | ○ | ○ | ○ | ○ | ○ |
| Example 47 | ○ | ○ | ○ | ○ | ○ | ○ |
| Example 48 | X | X | X | X | X | X |
| Example 49 | ○ | ○ | ○ | ○ | ○ | ○ |
| Example 50 | ○ | ○ | ○ | ○ | ○ | ○ |
| Example 51 | ○ | ○ | ○ | ○ | ○ | ○ |
| Example 52 | ○ | ○ | ○ | ○ | ○ | ○ |
| Example 53 | X | X | X | X | X | X |
| Example 54 | X | X | X | X | X | X |
| Example 55 | ○ | ○ | ○ | ○ | ○ | X |
| Example 56 | ○ | ○ | ○ | ○ | X | X |
| Example 57 | ○ | ○ | ○ | ○ | ○ | X |
| Example 58 | ○ | ○ | ○ | ○ | ○ | ○ |
| Example 59 | ○ | ○ | ○ | ○ | ○ | ○ |
| Example 60 | ○ | ○ | ○ | ○ | ○ | ○ |
| Example 61 | ○ | ○ | ○ | ○ | ○ | ○ |
| Example 62 | ○ | ○ | ○ | ○ | ○ | ○ |
| Example 63 | ○ | X | X | X | X | X |

TABLE 9

Residual negative frictional force after 1 year elapsed at each used temperature τ (N/m²): Upper column
Stiffness Coefficient S (S/m²): Middle column
Evaluation ⊙ : Optimum ○ : Usable ×: Not usable): Under column

| | 40° C. | 50° C. | 60° C. | 70° C. | 80° C. | 90° C. | 100° C. | 110° C. |
|---|---|---|---|---|---|---|---|---|
| Example 1 | $3.3 \times 10^4$ | $3.3 \times 10^2$ | $3.3 \times 10^{-2}$ | $3.3 \times 10^{-4}$ | $3.3 \times 10^{-5}$ | — | — | — |
| | $10^3$ | $10^1$ | $10^{-3}$ | $10^{-5}$ | $10^{-6}$ | $10^{-6}$ | $10^{-6}$ | $10^{-6}$ |
| | × | ⊙ | ⊙ | ○ | × | × | × | × |
| Example 2 | $3.3 \times 10^5$ | $3.3 \times 10^3$ | $3.3 \times 10^1$ | $3.3 \times 10^0$ | $3.3 \times 10^{-3}$ | $3.3 \times 10^{-3}$ | $3.3 \times 10^{-4}$ | $3.3 \times 10^{-5}$ |
| | $10^4$ | $10^2$ | $10^0$ | $10^{-1}$ | $10^{-2}$ | $10^{-4}$ | $10^{-5}$ | $10^{-6}$ |
| | × | × | ⊙ | ⊙ | ⊙ | ⊙ | ○ | × |
| Example 3 | $3.3 \times 10^4$ | $3.3 \times 10^2$ | $3.3 \times 10^{-2}$ | $3.3 \times 10^{-4}$ | $3.3 \times 10^{-5}$ | — | — | — |
| | $10^3$ | $10^1$ | $10^{-3}$ | $10^{-5}$ | $10^{-6}$ | $10^{-6}$ | $10^{-6}$ | $10^{-6}$ |
| | × | ⊙ | ⊙ | ○ | × | × | × | × |
| Example 4 | $3.3 \times 10^3$ | $3.3 \times 10^3$ | $3.3 \times 10^1$ | $3.3 \times 10^0$ | $3.3 \times 10^{-3}$ | $3.3 \times 10^{-3}$ | $3.3 \times 10^{-4}$ | $3.3 \times 10^{-5}$ |
| | $10^4$ | $10^2$ | $10^0$ | $10^{-1}$ | $10^{-2}$ | $10^{-4}$ | $10^{-5}$ | $10^{-6}$ |
| | × | × | ⊙ | ⊙ | ⊙ | ⊙ | ○ | × |

TABLE 10

Residual negative frictional force after 1 year elapsed at each used temperature τ (N/m²): Upper column,
Stiffness Coefficient S (S/m²): Middle column,
Evaluation ⊙ : Optimum ○ : Usable ×: Not usable): Under column

| | 80° C. | 90° C. | 100° C. | 110° C. | 120° C. | 130° C. | 140° C. | 150° C. | 160° C. |
|---|---|---|---|---|---|---|---|---|---|
| Example 5* | — | — | — | — | $3.3 \times 10^6$ | $3.3 \times 10^{-1}$ | $3.3 \times 10^{-1}$ | $3.3 \times 10^{-2}$ | $3.3 \times 10^{-3}$ |
| | $>10^5$ | $>10^5$ | $>10^5$ | $>10^5$ | $10^5$ | $10^{-2}$ | $10^{-2}$ | $10^{-3}$ | $10^{-4}$ |
| | × | × | × | × | × | ⊙ | ⊙ | ⊙ | ⊙ |
| Example 6 | — | — | — | — | $3.3 \times 10^6$ | $3.3 \times 10^{-1}$ | $3.3 \times 10^{-1}$ | $3.3 \times 10^{-2}$ | $3.3 \times 10^{-3}$ |
| | $>10^5$ | $>10^5$ | $>10^5$ | $>10^5$ | $10^5$ | $10^{-2}$ | $10^{-2}$ | $10^{-3}$ | $10^{-4}$ |
| | × | × | × | × | × | ⊙ | ⊙ | ⊙ | ⊙ |
| Example 7 | — | — | — | — | $3.3 \times 10^6$ | $3.3 \times 10^{-1}$ | $3.3 \times 10^{-2}$ | $3.3 \times 10^{-3}$ | $3.3 \times 10^{-3}$ |
| | $>10^5$ | $>10^5$ | $>10^5$ | $>10^5$ | $10^5$ | $10^{-2}$ | $10^{-3}$ | $10^{-4}$ | $10^{-4}$ |
| | × | × | × | × | × | ⊙ | ⊙ | ⊙ | ⊙ |
| Example 8* | $3.3 \times 10^6$ | $3.3 \times 10^6$ | $3.3 \times 10^1$ | $3.3 \times 10^1$ | $3.3 \times 10^1$ | $3.3 \times 10^0$ | $3.3 \times 10^{-1}$ | $3.3 \times 10^{-2}$ | $3.3 \times 10^{-3}$ |
| | $10^5$ | $10^5$ | $10^0$ | $10^0$ | $10^0$ | $10^{-1}$ | $10^{-2}$ | $10^{-3}$ | $10^{-4}$ |
| | × | × | ⊙ | ⊙ | ⊙ | ⊙ | ⊙ | ⊙ | ⊙ |
| Example 9 | $3.3 \times 10^5$ | $3.3 \times 10^6$ | $3.3 \times 10^1$ | $3.3 \times 10^1$ | $3.3 \times 10^1$ | $3.3 \times 10^1$ | $3.3 \times 10^0$ | $3.3 \times 10^{-1}$ | $3.3 \times 10^{-2}$ | $3.3 \times 10^{-3}$ |
| | $10^5$ | $10^5$ | $10^0$ | $10^0$ | $10^0$ | $10^{-1}$ | $10^{-2}$ | $10^{-3}$ | $10^{-4}$ |
| | × | × | ⊙ | ⊙ | ⊙ | ⊙ | ⊙ | ⊙ | ⊙ |
| Example 10* | $3.3 \times 10^5$ | $3.3 \times 10^6$ | $3.3 \times 10^1$ | $3.3 \times 10^1$ | $3.3 \times 10^1$ | $3.3 \times 10^1$ | $3.3 \times 10^0$ | $3.3 \times 10^{-1}$ | $3.3 \times 10^{-2}$ |
| | $10^5$ | $10^5$ | $10^0$ | $10^0$ | $10^0$ | $10^0$ | $10^{-1}$ | $10^{-2}$ | $10^{-3}$ |
| | × | × | ⊙ | ⊙ | ⊙ | ⊙ | ⊙ | ⊙ | ⊙ |
| Example 11 | $3.3 \times 10^5$ | $3.3 \times 10^1$ | $3.3 \times 10^0$ | $3.3 \times 10^0$ | $3.3 \times 10^0$ | $3.3 \times 10^{-2}$ | $3.3 \times 10^{-3}$ | $3.3 \times 10^{-4}$ | $3.3 \times 10^{-5}$ |
| | $10^5$ | $10^0$ | $10^{-1}$ | $10^{-1}$ | $10^{-1}$ | $10^{-3}$ | $10^{-4}$ | $10^{-5}$ | $10^{-6}$ |
| | × | ⊙ | ⊙ | ⊙ | ⊙ | ⊙ | ⊙ | ⊙ | ⊙ |
| Example 16* | $3.3 \times 10^6$ | $3.3 \times 10^6$ | $3.3 \times 10^1$ | $3.3 \times 10^1$ | $3.3 \times 10^1$ | $3.3 \times 10^1$ | $3.3 \times 10^0$ | $3.3 \times 10^{-1}$ | $3.3 \times 10^{-2}$ |
| | $10^5$ | $10^5$ | $10^0$ | $10^0$ | $10^0$ | $10^0$ | $10^{-1}$ | $10^{-2}$ | $10^{-3}$ |
| | × | × | ⊙ | ⊙ | ⊙ | ⊙ | ⊙ | ⊙ | ⊙ |
| Example 17 | $3.3 \times 10^6$ | $3.3 \times 10^1$ | $3.3 \times 10^0$ | $3.3 \times 10^0$ | $3.3 \times 10^{-1}$ | $3.3 \times 10^{-3}$ | $3.3 \times 10^{-4}$ | $3.3 \times 10^{-5}$ | $3.3 \times 10^{-5}$ |
| | $10^5$ | $10^0$ | $10^{-1}$ | $10^{-1}$ | $10^{-2}$ | $10^{-4}$ | $10^{-5}$ | $10^{-6}$ | $10^{-6}$ |
| | × | ⊙ | ⊙ | ⊙ | ⊙ | ⊙ | ⊙ | ○ | × | × |

*Example 5: Examples 19, 21 also similar
Example 8: Examples 20, 22, 23 also similar
Example 10: Example 12–15 also similar
Example 16: Example 18 also similar

TABLE 11

Residual negative frictional force after 1 year elapsed at each used temperature τ (N/m²): Upper column,
Stiffness Coefficient S (S/m²): Middle column,
Evaluation ( ⊙ : Optimum ○ : Usable ×: Not usable): Under column

| | 70° C. | 80° C. | 90° C. | 100° C. | 110° C. | 120° C. | 130° C. | 140° C. | 150° C. | 160° C. |
|---|---|---|---|---|---|---|---|---|---|---|
| Example 24 | $3.3 \times 10^8$ | $3.3 \times 10^7$ | $3.3 \times 10^6$ | $3.3 \times 10^5$ | $3.3 \times 10^3$ | $3.3 \times 10^1$ | $3.3 \times 10^{-1}$ | $3.3 \times 10^{-3}$ | $3.3 \times 10^{-4}$ | $3.3 \times 10^{-5}$ |
| | $10^7$ | $10^6$ | $10^5$ | $10^4$ | $10^2$ | $10^0$ | $10^{-2}$ | $10^{-4}$ | $10^{-5}$ | $10^{-6}$ |
| | × | × | × | × | × | ⊙ | ⊙ | ⊙ | ○ | × |
| Example 25 | $3.3 \times 10^6$ | $3.3 \times 10^7$ | $3.3 \times 10^6$ | $3.3 \times 10^4$ | $3.3 \times 10^3$ | $3.3 \times 10^0$ | $3.3 \times 10^{-1}$ | $3.3 \times 10^{-3}$ | $3.3 \times 10^{-4}$ | $3.3 \times 10^{-5}$ |
| | $10^7$ | $10^6$ | $10^5$ | $10^3$ | $10^2$ | $10^{-1}$ | $10^{-2}$ | $10^{-4}$ | $10^{-5}$ | $10^{-6}$ |
| | × | × | × | × | × | ⊙ | ⊙ | ⊙ | ○ | × |

TABLE 11-continued

Residual negative frictional force after 1 year elapsed at each used temperature τ (N/m²): Upper column,
Stiffness Coefficient S (S/m²): Middle column,
Evaluation (◉ : Optimum  ○ : Usable  ×: Not usable): Under column

| | 70° C. | 80° C. | 90° C. | 100° C. | 110° C. | 120° C. | 130° C. | 140° C. | 150° C. | 160° C. |
|---|---|---|---|---|---|---|---|---|---|---|
| Example 26 | $3.3 \times 10^6$ $10^5$ × | $3.3 \times 10^6$ $10^5$ × | $3.3 \times 10^4$ $10^3$ × | $3.3 \times 10^1$ $10^0$ ◉ | $3.3 \times 10^0$ $10^{-1}$ ◉ | $3.3 \times 10^{-1}$ $10^{-2}$ ◉ | $3.3 \times 10^{-1}$ $10^{-2}$ ◉ | $3.3 \times 10^{-3}$ $10^{-4}$ ◉ | $3.3 \times 10^{-4}$ $10^{-5}$ ○ | $3.3 \times 10^{-5}$ $10^{-6}$ × |
| Example 27* | $3.3 \times 10^7$ $10^6$ × | $3.3 \times 10^5$ $10^4$ × | $3.3 \times 10^2$ $10^1$ ◉ | $3.3 \times 10^{-1}$ $10^{-2}$ ◉ | $3.3 \times 10^{-1}$ $10^{-2}$ ◉ | $3.3 \times 10^{-1}$ $10^{-2}$ ◉ | $3.3 \times 10^{-3}$ $10^{-4}$ ◉ | $3.3 \times 10^{-4}$ $10^{-5}$ ◉ | $3.3 \times 10^{-5}$ $10^{-6}$ ○ | $3.3 \times 10^{-5}$ $10^{-6}$ × |
| Example 28 | $3.3 \times 10^5$ $10^4$ × | $3.3 \times 10^3$ $10^2$ × | $3.3 \times 10^1$ $10^0$ ◉ | $3.3 \times 10^{-1}$ $10^{-2}$ ◉ | $3.3 \times 10^{-2}$ $10^{-3}$ ◉ | $3.3 \times 10^{-4}$ $10^{-5}$ ○ | $3.3 \times 10^{-5}$ $10^{-6}$ × | $3.3 \times 10^{-5}$ $10^{-6}$ × | $3.3 \times 10^{-5}$ $10^{-6}$ × | $3.3 \times 10^{-5}$ $10^{-6}$ × |
| Example 29 | $3.3 \times 10^0$ $10^{-1}$ ◉ | $3.3 \times 10^{-1}$ $10^{-2}$ ◉ | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-4}$ $10^{-5}$ ○ | $3.3 \times 10^{-5}$ $10^{-6}$ × | $3.3 \times 10^{-5}$ $10^{-6}$ × | $3.3 \times 10^{-5}$ $10^{-6}$ × | $3.3 \times 10^{-5}$ $10^{-6}$ × |
| Example 30 | $3.3 \times 10^0$ $10^{-1}$ ◉ | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-4}$ $10^{-5}$ ○ | $3.3 \times 10^{-5}$ $10^{-5}$ × | $3.3 \times 10^{-5}$ $10^{-6}$ × | $3.3 \times 10^{-5}$ $10^{-6}$ × | $3.3 \times 10^{-5}$ $10^{-6}$ × | $3.3 \times 10^{-5}$ $10^{-6}$ × |
| Example 31 | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-4}$ $10^{-5}$ ○ | $3.3 \times 10^{-5}$ $10^{-6}$ × | $3.3 \times 10^{-6}$ $10^{-6}$ × | $3.3 \times 10^{-5}$ $10^{-6}$ × | $3.3 \times 10^{-5}$ $10^{-5}$ × | $3.3 \times 10^{-5}$ $10^{-6}$ × | $3.3 \times 10^{-5}$ $10^{-6}$ × |

*Example 27: Examples 35, 36, 39, 40 also similar

TABLE 12

Residual negative frictional force after 1 year elapsed at each used temperature τ (N/m²): Upper column,
Stiffness Coefficient S (S/m²): Middle column,
Evaluation ◉ : Optimum  ○ : Usable  ×: Not usable): Under column

| | 70° C. | 80° C. | 90° C. | 100° C. | 110° C. | 120° C. | 130° C. | 140° C. | 150° C. | 160° C. |
|---|---|---|---|---|---|---|---|---|---|---|
| Example 32 | $3.3 \times 10^6$ $10^5$ × | $3.3 \times 10^5$ $10^4$ × | $3.3 \times 10^2$ $10^1$ ◉ | $3.3 \times 10^{-1}$ $10^{-2}$ ◉ | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-4}$ $10^{-5}$ × | $3.3 \times 10^{-5}$ $10^{-6}$ × | $3.3 \times 10^{-5}$ $10^{-6}$ × |
| Example 33 | $3.3 \times 10^6$ $10^5$ × | $3.3 \times 10^5$ $10^4$ × | $3.3 \times 10^2$ $10^1$ ◉ | $3.3 \times 10^{-1}$ $10^{-2}$ ◉ | $3.3 \times 10^{-1}$ $10^{-2}$ ◉ | $3.3 \times 10^{-2}$ $10^{-3}$ ◉ | $3.3 \times 10^{-3}$ $10hu-4$ ◉ | $3.3 \times 10^{-4}$ $10^{-5}$ × | $3.3 \times 10^{-5}$ $10^{-6}$ × | $3.3 \times 10^{-5}$ $10^{-6}$ × |
| Example 34 | $3.3 \times 10^6$ $10^5$ × | $3.3 \times 10^5$ $10^4$ × | $3.3 \times 10^2$ $10^1$ ◉ | $3.3 \times 10^{-1}$ $10^{-2}$ ◉ | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-4}$ $10^{-5}$ × | $3.3 \times 10^{-5}$ $10^{-6}$ × | $3.3 \times 10^{-5}$ $-^{-6}$ × |
| Example 37 | $3.3 \times 10^5$ $10^5$ × | $3.3 \times 10^5$ $10^4$ × | $3.3 \times 10^2$ $10^1$ ◉ | $3.3 \times 10^{-1}$ $10^{-2}$ ◉ | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-4}$ $10^{-5}$ × | $3.3 \times 10^{-5}$ $10^{-6}$ × | $3.3 \times 10^{-5}$ $10^{-6}$ × |

*Example 37: Example 38 also similar

TABLE 13

Residual negative frictional force after 1 year elapsed at each used temperature τ (N/m²): Upper column
Stiffness Coefficient S (S/m²): Middle column
Evaluation ◉ : Optimum  ○ : Usable  ×: Not usable): Under column

| | 70° C. | 80° C. | 90° C. | 100° C. | 110° C. | 120° C. | 130° C. | 110° C. |
|---|---|---|---|---|---|---|---|---|
| Example 41* | $3.3 \times 10^6$ $10^5$ × | $3.3 \times 10^6$ $10^5$ × | $3.3 \times 10^6$ $10^5$ × | $3.3 \times 10^{-1}$ $10^{-1}$ ◉ | $3.3 \times 10^0$ $10^{-1}$ ◉ | $3.3 \times 10^{-2}$ $10^{-3}$ ◉ | $3.3 \times 10^{-3}$ $10^{-4}$ ◉ | $3.3 \times 10^{-5}$ $10^{-6}$ × |
| Example 42 | $3.3 \times 10^6$ $10^5$ × | $3.3 \times 10^6$ $10^5$ × | $3.3 \times 10^1$ $10^0$ ◉ | $3.3 \times 10^{-1}$ $10^{-2}$ ◉ | $3.3 \times 10^{-1}$ $10^{-2}$ ◉ | $3.3 \times 10^{-1}$ $10^{-3}$ ◉ | $3.3 \times 10^{-3}$ $10^{-4}$ ◉ | $3.3 \times 10^{-5}$ $10^{-6}$ × |
| Example 46 | $3.3 \times 10^6$ $10^5$ × | $3.3 \times 10^6$ $10^5$ × | $3.3 \times 10^1$ $10^0$ ◉ | $3.3 \times 10^{-1}$ 502 | $3.3 \times 10^{-1}$ $10^{-2}$ ◉ | $3.3 \times 10^{-2}$ $10^{-3}$ ◉ | $3.3 \times 10^{-3}$ $10^{-5}$ ◉ | $3.3 \times 10^{-5}$ $10^{-6}$ × |
| Example 47* | $3.3 \times 10^6$ $10^5$ × | $3.3 \times 10^1$ $10^0$ ◉ | $3.3 \times 10^1$ $10^0$ ◉ | $3.3 \times 10^1$ $10^{-1}$ ◉ | $3.3 \times 10^1$ $10^{-2}$ ◉ | $3.3 \times 10^1$ $10^{-3}$ ◉ | $3.3 \times 10^{-4}$ $10^{-4}$ ○ | $3.3 \times 10^{-5}$ $10^{-6}$ × |
| Example 50 | $3.3 \times 10^6$ $10^5$ × | $3.3 \times 10^6$ $10^5$ × | $3.3 \times 10^1$ $10^0$ ◉ | $3.3 \times 10^{-1}$ $10^{-2}$ ◉ | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-5}$ $10^{-6}$ × |
| Example 51 | $3.3 \times 10^6$ $10^5$ × | $3.3 \times 10^6$ $10^5$ × | $3.3 \times 10^1$ $10^0$ ◉ | $3.3 \times 10^{-1}$ $10^{-2}$ ◉ | $3.3 \times 10^{-1}$ $10^{-2}$ ◉ | $3.3 \times 10^{-2}$ $10^{-3}$ ◉ | $3.3 \times 10^{-3}$ $10^{-4}$ ◉ | $3.3 \times 10^{-5}$ $10^{-6}$ × |

TABLE 13-continued

Residual negative frictional force after 1 year elapsed at each used temperature τ (N/m²): Upper column
Stiffness Coefficient S (S/m²): Middle column
Evaluation ⊚ : Optimum ○ : Usable x: Not usable): Under column

| | 70° C. | 80° C. | 90° C. | 100° C. | 110° C. | 120° C. | 130° C. | 110° C. |
|---|---|---|---|---|---|---|---|---|
| Example 52* | $3.3 \times 10^6$ $10^5$ × | $3.3 \times 10^1$ $10^0$ ⊚ | $3.3 \times 10^1$ $10^0$ ⊚ | $3.3 \times 10^1$ $10^0$ ⊚ | $3.3 \times 10^0$ $10^{-1}$ ⊚ | $3.3 \times 10^{-1}$ $10^{-2}$ ⊚ | $3.3 \times 10^{-5}$ $10^{-6}$ × | $3.3 \times 10^{-5}$ $10^{-6}$ × |

*Example 41: Examples 43, 44, 45 also similar
Example 47: Examples 48, 49 also similar
Example 52: Examples 53, 54 also similar

TABLE 14

Residual negative frictional force after 1 year elapsed at each used temperature τ (N/m²): Upper column,
Stiffness Coefficient S (S/m²): Middle column,
Evaluation ⊚ : Optimum ○ : Usable x: Not usable): Under column

| | 120° C. | 130° C. | 140° C. | 150° C. | 160° C. | 170° C. | 180° C. | 190° C. | 200° C. |
|---|---|---|---|---|---|---|---|---|---|
| Example 55* | $3.3 \times 10^6$ $10^5$ × | $3.3 \times 10^6$ $10^4$ × | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^2$ $10^1$ ⊚ | $3.3 \times 10^{-1}$ $10^{-2}$ ⊚ | $3.3 \times 10^{-1}$ $10^{-2}$ ⊚ |
| Example 56 | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^2$ $10^1$ ⊚ | $3.3 \times 10^{-1}$ $10^{-2}$ ⊚ | $3.3 \times 10^{-1}$ $10^{-2}$ ⊚ | $3.3 \times 10^{-2}$ $10^{-3}$ ⊚ |
| Example 58* | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^2$ $10^1$ ⊚ | $3.3 \times 10^{-1}$ $10^{-2}$ ⊚ | $3.3 \times 10^{-1}$ $10^{-2}$ ⊚ | $3.3 \times 10^{-2}$ $10^{-3}$ ⊚ |
| Example 60* | $3.3 \times 10^6$ $10^5$ × | $3.3 \times 10^6$ $10^4$ × | $3.3 \times 10^6$ $10^5$ × | $3.3 \times 10^6$ $10^5$ × | $3.3 \times 10^2$ $10^1$ ⊚ | $3.3 \times 10^{-1}$ $10^{-2}$ ⊚ | $3.3 \times 10^{-1}$ $10^{-2}$ ⊚ | $3.3 \times 10^{-3}$ $10^{-4}$ ⊚ | $3.3 \times 10^{-4}$ $10^{-5}$ ○ |
| Example 62* | $3.3 \times 10^6$ $10^5$ × | $3.3 \times 10^6$ $10^5$ × | $3.3 \times 10^6$ $10^5$ × | $3.3 \times 10^2$ $10^1$ ⊚ | $3.3 \times 10^{-1}$ $10^{-2}$ ⊚ | $3.3 \times 10^{-1}$ $10^{-2}$ ⊚ | $3.3 \times 10^{-3}$ $10^{-4}$ ⊚ | $3.3 \times 10^{-4}$ $10^{-5}$ ○ | $3.3 \times 10^{-5}$ $10^{-6}$ × |
| Comparative Example 1 | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^6$ $10^5$ × | $3.3 \times 10^5$ $10^5$ × | $3.3 \times 10^6$ $10^5$ × |

*Example 55: Examples 57 also similar
Example 58: Examples 59 also similar
Example 60: Examples 61 also similar
Example 62: Examples 63 also similar

TABLE 15

Upper column: Stiffness factor S(N/m²) after 10 days elapsed at each used temperature
Under column: Evaluation ⊚ Optimum (Sliding layer did not deform)
○ Usable (Sliding layer slightly deformed)
X Not usable (Deformed)

| | 40° C. | 50° C. | 60° C. | 70° C. |
|---|---|---|---|---|
| Example 1 | $10^4$ ⊚ | $10^2$ X | $10^{-2}$ X | $10^{-6}$ X |
| Example 2 | $10^5$ ⊚ | $10^3$ ⊚ | $10^1$ X | $10^0$ X |
| Example 3 | $10^4$ ⊚ | $10^0$ X | $10^{-2}$ X | $10^{-6}$ X |
| Example 4 | $10^5$ ⊚ | $10^3$ ⊚ | $10^1$ X | $10^0$ X |

TABLE 16

Upper column: Stiffness factor S(N/m²) after 10 days elapsed at each used temperature
Under column: Evaluation ⊚ Optimum (Sliding layer did not deform)
○ Usable (Sliding layer slightly deformed)
X Not usable (Deformed)

| | 80° C. | 90° C. | 100° C. | 110° C. | 120° C. | 130° C. |
|---|---|---|---|---|---|---|
| Example 5* | >$10^6$ ⊚ | >$10^6$ ⊚ | >$10^6$ ⊚ | >$10^6$ ⊚ | $10^6$ ⊚ | $10^{-1}$ X |
| Example 6 | >$10^6$ ⊚ | >$10^6$ ⊚ | >$10^6$ ⊚ | >$10^6$ ⊚ | $10^6$ ⊚ | $10^{-1}$ X |
| Example 7 | >$10^6$ ⊚ | >$10^6$ ⊚ | >$10^6$ ⊚ | >$10^6$ ⊚ | $10^6$ ⊚ | $10^{-1}$ X |
| Example 8* | $10^6$ ⊚ | $10^6$ ⊚ | $10^1$ X | $10^1$ X | $10^1$ X | $10^0$ X |
| Example 9 | $10^6$ ⊚ | $10^6$ ⊚ | $10^1$ X | $10^1$ X | $10^1$ X | $10^0$ X |
| Example 10* | $10^6$ ⊚ | $10^6$ ⊚ | $10^1$ X | $10^1$ X | $10^1$ X | $10^1$ X |
| Example 11 | $10^6$ ⊚ | $10^1$ ⊚ | $10^0$ X | $10^0$ X | $10^0$ X | $10^{-2}$ X |
| Example 16 | $10^6$ ⊚ | $10^6$ ⊚ | $10^1$ X | $10^1$ X | $10^1$ X | $10^1$ X |

TABLE 16-continued

Upper column: Stiffness factor $S(N/m^2)$ after 10 days elapsed at each used temperature
Under column: Evaluation ⊙ Optimum (Sliding layer did not deform)
○ Usable (Sliding layer slightly deformed)
X Not usable (Deformed)

|  | 80° C. | 90° C. | 100° C. | 110° C. | 120° C. | 130° C. |
|---|---|---|---|---|---|---|
| Example 18 | $10^6$ | $10^1$ | $10^0$ | $10^0$ | $10^1$ | $10^{-3}$ |
|  | ⊙ | X | X | X | X | X |

*Example 5: Example 19, 21 also similar,
Example 8: Example 20, 22, 23 also similar
Example 10: Example 12–15 also similar,
Example 16: Example 18 also similar

TABLE 17

Upper column: Stiffness factor $S$ $(N/m^3)$ after 10 days elapsed at each used temperature
Under column: Evaluation ⊙ Optimum (Sliding layer did not deform) ○ Usable (Sliding layer slightly deformed) × Not usable (Deformed)

|  | 40° C. | 50° C. | 60° C. | 70° C. | 80° C. | 90° C. | 100° C. | 110° C. | 120° C. |
|---|---|---|---|---|---|---|---|---|---|
| Example 24 | $>10^8$ | $>10^8$ | $>10^8$ | $10^8$ | $10^7$ | $10^6$ | $10^5$ | $10^3$ | $10^1$ |
|  | ⊙ | ⊙ | ⊙ | ⊙ | ⊙ | ⊙ | ⊙ | ⊙ | × |
| Example 25 | $>10^8$ | $>10^8$ | $>10^8$ | $10^8$ | $10^6$ | $10^5$ | $10^3$ | $10^3$ | $10^{-1}$ |
|  | ⊙ | ⊙ | ⊙ | ⊙ | ⊙ | ⊙ | ⊙ | ⊙ | × |
| Example 26 | $>10^7$ | $>10^7$ | $>10^7$ | $10^7$ | $10^6$ | $10^4$ | $10^1$ | $10^0$ | $10^{-1}$ |
|  | ⊙ | ⊙ | ⊙ | ⊙ | ⊙ | ⊙ | × | × | × |
| Example 27* | $>10^7$ | $>10^7$ | $>10^7$ | $10^7$ | $10^5$ | $10^2$ | $10^1$ | $10^{-1}$ | $10^{-1}$ |
|  | ⊙ | ⊙ | ⊙ | ⊙ | ⊙ | × | × | × | × |
| Example 28 | $>10^5$ | $>10^5$ | $>10^5$ | $10^5$ | $10^3$ | $10^1$ | $10^{-1}$ | $10^{-2}$ | $10^{-4}$ |
|  | ⊙ | ⊙ | ⊙ | ⊙ | ⊙ | × | × | × | × |
| Example 29 | $10^6$ | $10^4$ | $10^1$ | $10^0$ | $10^{-1}$ | $10^1$ | $10^{-2}$ | $10^{-3}$ | $10^4$ |
|  | ⊙ | ⊙ | × | × | × | × | × | × | × |
| Example 30 | $10^6$ | $10^4$ | $10^1$ | $10^0$ | $10^1$ | $10^{-2}$ | $10^{-3}$ | $10^4$ | $\leq 10^{-4}$ |
|  | ⊙ | ⊙ | × | × | × | × | × | × | × |
| Example 31 | $10^4$ | $10^1$ | $10^0$ | $10^{-1}$ | $10^2$ | $10^{-3}$ | $10^{-4}$ | $10^{-4}$ | $10^{-4}$ |
|  | ⊙ | × | × | × | × | × | × | × | × |

TABLE 18

Upper column: Stiffness factor $S(N/m^2)$ after 10 days elapsed at each used temperature
Under column: Evaluation ⊙ Optimum (Sliding layer did not deform)
○ Usable (Sliding layer slightly deformed)
X Not usable (Deformed)

|  | 70° C. | 80° C. | 90° C. | 100° C. | 110° C. | 120° C. |
|---|---|---|---|---|---|---|
| Example 32 | $10^6$ | $10^5$ | $10^2$ | $10^1$ | $10^{-1}$ | $10^{-2}$ |
|  | ⊙ | ⊙ | X | X | X | X |
| Example 33 | $10^6$ | $10^5$ | $10^2$ | $10^{-1}$ | $10^1$ | $10^{-2}$ |
|  | ⊙ | ⊙ | X | X | X | X |
| Example 34 | $10^6$ | $10^5$ | $10^2$ | $10^1$ | $10^1$ | $10^{-2}$ |
|  | ⊙ | ⊙ | X | X | X | X |
| Example 37 | $10^6$ | $10^5$ | $10^2$ | $10^{-1}$ | $10^1$ | $10^{-2}$ |
|  | ⊙ | ⊙ | X | X | X | X |

*Example 37: Example 38 also similar

TABLE 19

Upper column: Stiffness factor $S(N/m^2)$ after 10 days elapsed at each used temperature
Under column: Evaluation ⊙ Optimum (Sliding layer did not deform)
○ Usable (Sliding layer slightly deformed)
X Not usable (Deformed)

|  | 70° C. | 80° C. | 90° C. | 100° C. | 110° C. | 120° C. |
|---|---|---|---|---|---|---|
| Example 41* | $10^6$ | $10^6$ | $10^6$ | $10^0$ | $10^0$ | $10^{-2}$ |
|  | ⊙ | ⊙ | ⊙ | X | X | X |
| Example 42 | $10^6$ | $10^6$ | $10^1$ | $10^1$ | $10^{-1}$ | $10^2$ |
|  | ⊙ | ⊙ | X | X | X | X |
| Example 46 | $10^6$ | $10^6$ | $10^1$ | $10^{-1}$ | $10^{-1}$ | $10^{-2}$ |
|  | ⊙ | ⊙ | X | X | X | X |
| Example 47* | $10^6$ | $10^1$ | $10^1$ | $10^0$ | $10^{-1}$ | $10^{-2}$ |
|  | ⊙ | ⊙ | X | X | X | X |
| Example 50 | $10^6$ | $10^6$ | $10^0$ | $10^1$ | $10^1$ | $10^{-2}$ |
|  | ⊙ | ⊙ | X | X | X | X |
| Example 51 | $10^6$ | $10^6$ | $10^1$ | $10^1$ | $10^{-1}$ | $10^{-2}$ |
|  | ⊙ | ⊙ | X | X | X | X |
| Example 52* | $10^1$ | $10^1$ | $10^1$ | $10^1$ | $10^0$ | $10^1$ |
|  | ⊙ | X | X | X | X | X |

*Example 41: Example 43–Example 45 also similar
Example 47: Example 48, 49 also similar
Example 52: Example 53, 54 also similar

TABLE 20

Upper column: Stiffness factor S (N/m²) after 10 days elapsed at each used temperature
Under column: Evaluation ◎ Optimum (Sliding layer did not deform)
○ Usable (Sliding layer slightly deformed) × Not usable (Deformed)

|  | 120° C. | 130° C. | 140° C. | 150° C. | 160° C. | 170° C. | 180° C. | 190° C. |
|---|---|---|---|---|---|---|---|---|
| Example 55* | 10⁶ ◎ | 10⁶ ◎ | 10⁶ ◎ | 10⁵ ◎ | 10⁶ ◎ | 10⁶ ◎ | 10² × | 10⁻¹ × |
| Example 56 | 10⁶ ◎ | 10⁶ ◎ | 10⁶ ◎ | 10⁶ ◎ | 10⁸ ◎ | 10² × | 10⁻¹ × | 10⁻¹ × |
| Example 58* | 10⁶ ◎ | 10⁶ ◎ | 10⁸ ◎ | 10⁶ ◎ | 10⁸ ◎ | 10² × | 10⁻¹ × | 10⁻¹ × |
| Example 60* | 10⁶ ◎ | 10⁶ ◎ | 10⁶ ◎ | 10⁶ ◎ | 10² × | 10¹ × | 10⁻¹ × | 10⁻³ × |
| Example 62* | 10⁶ ◎ | 10⁶ ◎ | 10⁸ ◎ | 10² × | 10⁻¹ × | 10⁻¹ × | 10⁻⁴ × | 10⁻⁵ × |

*Example 55: Example 57 also similar, Example 58: Example 59 also similar,
Example 60: Example 61 also similar, Example 62: Example 63 also similar

TABLE 21

|  | Adhesive Layer | Protection Layer | Usable Temperature | Constructable Temperature |
|---|---|---|---|---|
| Example 1 | ○ | ○ | 50 ~ 70 | ≦40 |
| Example 2 | ○ | ○ | 60 ~ 90 | ≦50 |
| Example 3 | ○ | X | 50 ~ 70 | <40 |
| Example 4 | ○ | X | 60 ~ 90 | <50 |
| Example 5 | ○ | ○ | 130 ~ 160 | ≦120 |
| Example 6 | ○ | ○ | 130 ~ 160 | ≦120 |
| Example 7 | ○ | ○ | 130 ~ 160 | <120 |
| Example 8 | ○ | ○ | 100 ~ 160 | <90 |
| Example 9 | ○ | ○ | 100 ~ 160 | ≦90 |
| Example 10 | ○ | ○ | 100 ~ 160 | ≦90 |
| Example 11 | ○ | ○ | 90 ~ 150 | <80 |
| Example 12 | ○ | ○ | 100 ~ 160 | ≦90 |
| Example 13 | ○ | ○ | 100 ~ 160 | ≦90 |
| Example 14 | ○ | ○ | 100 ~ 160 | ≦90 |
| Example 15 | ○ | ○ | 100 ~ 160 | ≦90 |
| Example 16 | ○ | ○ | 100 ~ 160 | ≦90 |
| Example 17 | ○ | ○ | 90 ~ 140 | ≦80 |
| Example 18 | ○ | ○ | 100 ~ 160 | ≦90 |
| Example 19 | ○ | X | 130 ~ 160 | ≦120 |
| Example 20 | ○ | X | 100 ~ 160 | <90 |
| Example 21 | X | ○ | 130 ~ 160 | ≦120 |
| Example 22 | X | ○ | 100 ~ 160 | ≦90 |
| Example 23 | X | X | 100 ~ 160 | <90 |
| Example 24 | ○ | ○ | 120 ~ 150 | ≦110 |
| Example 25 | ○ | ○ | 120 ~ 150 | ≦110 |
| Example 26 | ○ | ○ | 90 ~ 150 | <90 |
| Example 27 | ○ | ○ | 90 ~ 140 | ≦80 |
| Example 28 | ○ | ○ | 90 ~ 120 | ≦80 |
| Example 29 | ○ | ○ | 70 ~ 120 | ≦50 |
| Example 30 | ○ | ○ | 70 ~ 110 | ≦50 |
| Example 31 | ○ | ○ | 70 ~ 100 | <40 |

TABLE 22

|  | Adhesive Layer | Protection Layer | Usable Temperature | Constructable Temperature |
|---|---|---|---|---|
| Example 32 | ○ | ○ | 90 ~ 140 | ≦80 |
| Example 33 | ○ | ○ | 90 ~ 140 | <80 |
| Example 34 | ○ | ○ | 90 ~ 140 | ≦80 |
| Example 35 | ○ | ○ | 90 ~ 140 | ≦80 |
| Example 36 | ○ | ○ | 90 ~ 140 | ≦80 |
| Example 37 | ○ | ○ | 90 ~ 140 | ≦80 |
| Example 38 | ○ | ○ | 90 ~ 140 | <80 |
| Example 39 | ○ | X | 90 ~ 140 | ≦80 |
| Example 40 | ○ | ○ | 90 ~ 140 | ≦80 |
| Example 41 | ○ | ○ | 100 ~ 130 | ≦90 |
| Example 42 | ○ | ○ | 90 ~ 130 | ≦80 |
| Example 43 | ○ | ○ | 100 ~ 130 | ≦90 |
| Example 44 | ○ | ○ | 100 ~ 130 | ≦90 |
| Example 45 | ○ | X | 100 ~ 130 | ≦90 |
| Example 46 | ○ | ○ | 90 ~ 130 | ≦80 |
| Example 47 | ○ | ○ | 80 ~ 130 | ≦70 |
| Example 48 | ○ | X | 80 ~ 130 | ≦70 |
| Example 49 | ○ | ○ | 80 ~ 130 | ≦70 |
| Example 50 | ○ | ○ | 90 ~ 130 | ≦80 |
| Example 51 | ○ | ○ | 90 ~ 130 | <80 |
| Example 52 | ○ | ○ | 80 ~ 120 | ≦70 |
| Example 53 | ○ | X | 80 ~ 120 | ≦70 |
| Example 54 | ○ | X | 80 ~ 120 | ≦70 |
| Example 55 | ○ | ○ | 180 ~ 200 | ≦170 |
| Example 56 | ○ | ○ | 170 ~ 200 | ≦160 |
| Example 57 | X | ○ | 180 ~ 200 | ≦170 |
| Example 58 | ○ | ○ | 170 ~ 200 | ≦160 |
| Example 59 | X | ○ | 170 ~ 200 | <160 |
| Example 60 | ○ | ○ | 160 ~ 200 | <150 |
| Example 61 | ○ | ○ | 160 ~ 200 | <150 |
| Example 62 | ○ | ○ | 150 ~ 190 | ≦140 |
| Example 63 | X | X | 150 ~ 190 | <140 |

As can be seen from Tables 21 and 22, in the oil well pipes provided with the adhesive layer, the sliding layer is strongly bonded to the steel pipe, and the results of thermal shock resistance, water resistance, etc. are excellent. Thus, the sliding layer has sufficient adhesive force to resist physical shocks upon transportation and construction of the oil well pipe, and the sliding layer does not separate under severe conditions. Accordingly, the sliding layer exhibits its own performance also after construction, and the oil well pipe does not fracture by ground subsidence. Besides, similar results are obtained in the case of using an adhesive resin as the sliding layer.

In the oil well pipes provided with the protection layer, abnormalities do not occur over a wide temperature range and it is possible to protect the oil well pipes through transportation, construction and operation of the oil well pipes from damage.

Furthermore, the oil well pipes of Examples 1–63 are usable in the temperature range where the residual negative frictional force after 1 year is $2 \times 10^3 N/m^2$ or less and where the stiffness factor $S(t)$ after 1 year is $10^{-5}$ to $10^3$, and the fracture possibility of the oil well pipes by ground subsidence is small. Moreover, they are constructable in the temperature range or $2 \times 10^2$ or more of the stiffness factor $S(t)$ after 10 days.

INDUSTRIAL FIELD OF UTILIZATION

By the invention, it is possible to prevent the fracture of the oil well pipe by ground subsidence and damage to the sliding layer and oil well pipe body upon burying construction of the oil well pipe as well as transportation of the oil well pipe.

What is claimed is:

1. An oil well pipe having an exterior sliding layer for reducing a frictional force acting thereon in which the improvement comprises said sliding layer having a thickness of at least 1 mm, a stiffness factor after one year at an operating temperature of the oil well pipe of from $10^{-5}$ N/m$^2$ to $10^3$ N/m$^2$ and a stiffness factor after 10 days at a construction temperature of the oil well pipe of at least $2 \times 10^2$ N/M$^2$, and comprising an organic material, and an adhesive layer provided between a pipe body and the sliding layer.

2. The oil well pipe of claim 1, wherein said sliding layer has a thickness of 1 to 5 mm.

3. The oil well pipe of claim 1, wherein said stiffness factor after one year at the operating temperature is in the range of $10^{-4}$ N/m$^2$ to $10^1$ N/m$^2$.

4. The oil well pipe of claim 1, wherein said operating temperature is from 100–130° C.

5. The oil well pipe of claim 1, wherein said operating temperature is from 100–140° C.

6. The oil well pipe of claim 1, wherein said construction temperature is from 80–110° C.

7. The oil well pipe of claim 1, wherein said construction temperature is from 80–120° C.

8. The oil well pipe as set forth in claim 1 wherein said sliding layer has a residual negative frictional force after 1 year of $2 \times 10^3$ N/m$^2$ or less at the operating temperature of the oil well pipe.

9. The oil well pipe as set forth in claim 1 wherein said sliding layer is made of a material composed of at least one resin selected from the group consisting of polyethylene resin, maleic anhydride-modified polyethylene resin, ethylene-vinyl acetate copolymer resin, maleic anhydride-modified ethylene-vinyl acetate copolymer resin, ethylene-maleic anhydride copolymer resin, ethylene-acrylic ester copolymer resin, ethylene-maleic anhydride-acrylic ester copolymer resin, polypropylene resin, polybutene resin, maleic anhydride-modified polypropylene resin, ethylene-propylene copolymer resin, and a resin obtained by blending the at least one resin.

10. The oil well pipe as set forth in claim 1 wherein said adhesive layer is made of a material composed of at least one resin selected from the group consisting of maleic anhydride-modified polyethylene resin, ethylene-maleic anhydride copolymer resin, ethylene-maleic anhydride-acrylic ester copolymer resin, maleic anhydride-modified ethylene-vinyl acetate copolymer resin and maleic anhydride modified polypropylene.

11. The oil well pipe as set forth in claim 1 additionally comprising a protection layer on the outside of the sliding layer.

12. The oil well pipe as set forth in claim 11 wherein said protection layer is made of a material composed of at least one resin selected from the group consisting of polypropylene resin, polybutene resin and ethylene-propylene copolymer resin.

* * * * *